United States Patent [19]

Pistor

[11] Patent Number: 4,743,092
[45] Date of Patent: May 10, 1988

[54] POLARIZING GRIDS FOR FAR-INFRARED AND METHOD FOR MAKING SAME

[75] Inventor: Helmut H. Pistor, Fairfax County, Va.

[73] Assignee: The United States of America as represented by the Secretary of the Army, Washington, D.C.

[21] Appl. No.: 935,472

[22] Filed: Nov. 26, 1986

[51] Int. Cl.⁴ .......................... G02B 5/30; G02B 1/00
[52] U.S. Cl. .................................... 350/370; 350/1.1; 350/320; 350/395
[58] Field of Search ................ 350/162.17, 162.2, 370, 350/394–395, 320, 1.1; 430/4, 11, 212, 290, 321

[56] References Cited

U.S. PATENT DOCUMENTS 648,748  5/1900  Ives .............................. 350/162.17

OTHER PUBLICATIONS

Auton, J. P. "Infrared Transmission Polarizers by Photolithography" App. Optics 6-1967, pp. 1023–1026.
Detche, K. S. "Photosensitive Materials", Sec. 5 of Handbook of Optics, Driscoll, W. G. editor, McGraw-Hill, pp. 5-1 to 5-15 & 5-23.
Optician, "Infrared Grid Polarizers", Manufacturing Optician International, 6-1969, p. 660.

Primary Examiner—William H. Punter
Attorney, Agent, or Firm—Max L. Harwell; John E. Holford; Anthony T. Lane

[57] ABSTRACT

A polarizing wire grid filter for use at far infrared frequencies is provided through simple photographic method which employs a newly marketed silver diffusion transfer-developer combination package film and a portable instant developing machine, all supplied by the manufacturer of the film.

10 Claims, 2 Drawing Sheets

POLARIZING GRIDS FOR FAR-INFRARED AND METHOD FOR MAKING SAME

The invention described herein may be manufactured, used, and licensed by the U.S. Government for Governmental purposes without the payment of any royalties thereon.

BACKGROUND OF THE INVENTION

1. Field of the Invention

The invention relates to light polarizing devices. Specifically it relates to wire grid polarizers in the far-infrared region of the electromagnetic spectrum and to a simple photographic means of forming these structures.

2. Description of Prior Art

A description of wire grid polarizers in the near infrared is found in the article "The Wire Grid as a Near-Infrared Polarizer" by George R. Bird and Maxfield Parrish, Jr. published in the *JOURNAL OF THE OPTICAL SOCIETY OF AMERICA*, Vol. 50, No. 9, September 1960. The techniques described in the article rely heavily on precise machining, complicated molding techniques and plating steps to form the polarization grids. There is a definite need for a simply made structure that can be used in the far-infrared region, which begins at about 8 microns and extends beyond 14 microns. Numerous thermal viewing devices operate in this spectrum, which are extremely useful in a variety of fields such as manufacturing, medical, environmental, low enforcement and military. The present invention seeks to fill this need taking into account the special properties of radiation in this portion of the spectrum.

SUMMARY OF THE INVENTION

A new periodic structure and method of manufacture is provided through a recently marketed set of photographic tools. The first is a film which has a tough, transparent polyester backing, a disposable emulsion layer, and a thin two layer image portion containing dense positive specularly reflective and electrically conductive silver images. Developing chemicals are included in the film packaging. The second is a highly portable and simple developing apparatus for this type of film which anyone can operate.

BRIEF DESCRIPTION OF THE DRAWINGS

The invention is best understood with reference to the attached drawings wherein.

DESCRIPTION OF PREFERRED EMBODIMENT OF INVENTION

The structures to be described are all formed from a specific type of photographic film based on a silver diffusion transfer process. Two such films are currently marketed by the "POLARIOD" Corporation under the trademarks "Polapan" and "Polagraph". Both are black and white films and have a resolution of at least 90 line pairs/mm, but the latter has twice the contrast of the former, which is preferred for the tuned structures to be described. The same manufacturer makes a third film under the trademark "Polachrome", which is closest to the first black and white film mentioned above, but has a color filter screen consisting of red, green and blue stripes with a resolution of 118 stripes/mm. All of these films are described in a publication "The Polaroid 35 mm Instant Slide System" by Samuel H. Liggero, Kenneth J. McCarthy and Joseph A. Stella.

Figure 1:
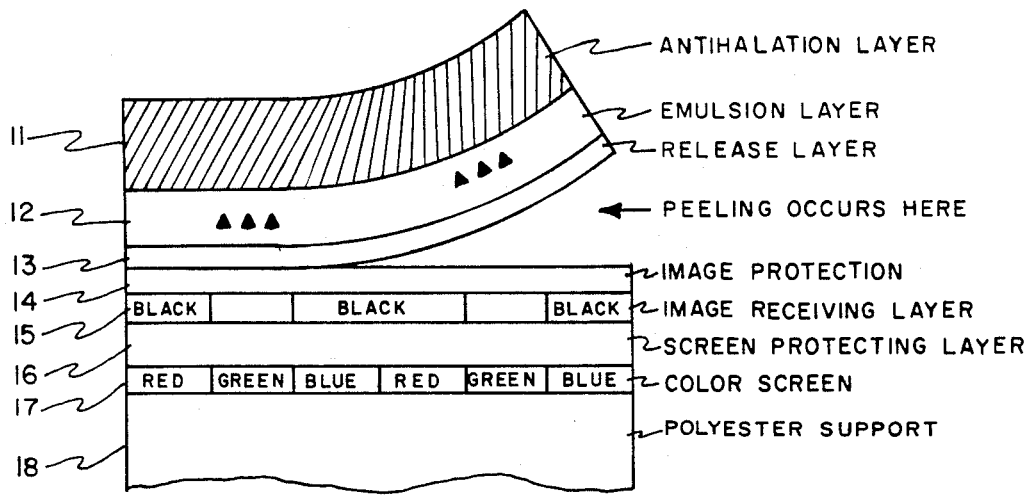
FIG. 1 shows a cross-section of a commercially available film used in the present invention.

FIG. 1 shows a cross-section of the film designated above prior to processing. Unlike most films it is designed to be exposed through its front polyester support layer 18. The back surface is formed by a black antihilation layer 11. This layer is followed by an emulsion layer 12, a release layer 13, a positive image protection layer 14 and a positive image receiving layer 15. The color type film also has a color screen protecting layer 16 and a screen layer 17 of red, green and blue alternating color filter stripes. During the processing of the film the exposed image migrates from emulsion layer 12 to receiving layer 15 and layers 11, 12 and 13 are removed. Measured on an electron micrograph (2500× magnification) these layers have a total thickness of about 15 mm, which reduces to 6 microns. The thickness of the image protection layer appears to be about 0.5 micron compared to 74 microns for support layer 18. The film can resolve line pairs less than 11 microns wide. The color stripes in layer 17 are about 8 microns wide.

Figure 2:
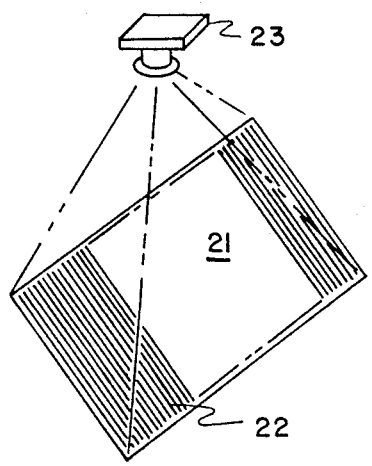
FIG. 2 2a shows a photographic system for forming far-infrared polarization grids.
Figure 3A:
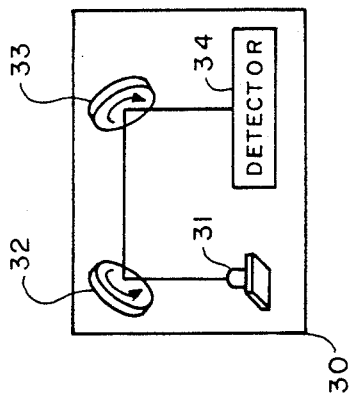
FIG. 3A shows a reflective embodiment of the system of FIG. 3.

FIG. 2 shows a photographic system for making the first grating according to the present invention. A background element is prepared which is preferably white and may, for example, by a floor or wall of a laboratory. Narrow black, straight or curved (e.g. circular), parallel lines are applied on the background either with paint or with tightly stretched black wires of uniform diameter. The whole is then photographed repeatedly at an appropriate distance with a camera 23 mounted in fixed relation to the background element, and which has been loaded with the film described above.

Figure 2A:
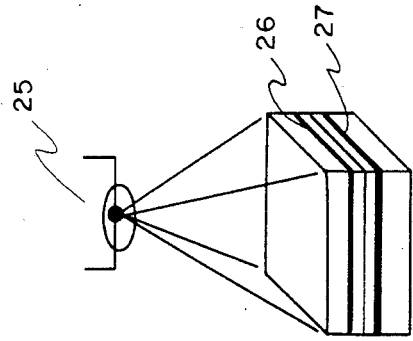

The width of the line and spacing of the camera is chosen so that the width of the images of the lines focussed on the film is about 5.5 microns and the spacing between the line images is about the same. The exposed film is then placed in a special processor with a chemical packet, the processor being available from the manufacturer and packet being included with the film. Development and processing of the film is achieved simply by turning a crank on the processor. Hereafter, this method will be defined herein by the terms "instantly developed" or "instant development". At least thirty six originals can be made with one instant development. Subsequent grating copies can then be made from these originals by contact printing, as shown in FIG. 2a. The latter can be done in a much smaller environment than the laboratory used for the original with a very unsophisticated contact printer. The original and copy are best made with a point source of light 25 and their image protecting layers 26 and 27 in contact. This reverses the grid pattern but this normally is not a problem, since an assymetrical grid pattern can simply be reversed in the original. The copies (or the orignals) may then be mounted in suitable frames which are rectangular, square, round, etc., to form a finished grating.

A grating may also be made by photographing a commercially available RONCHI ruled plate at a distance determined by the desired line spacing.

A simpler but less precise method of making the original involves the use of the color type film described above. The film is exposed to one or two sources from a set of primary colored light sources corresponding to the primary color filters in the color screen and developed. This provides an image with narrow lines and broad spaces or the reverse, respectively. Copies of this can then be made using black and white film, as above, and using the same colored light sources or a white light source.

Figure 3:
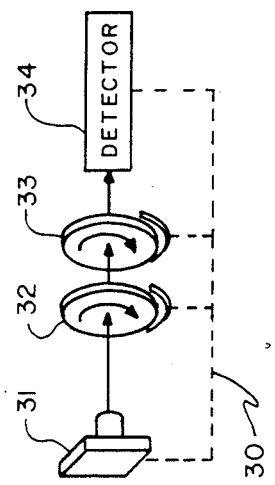
FIG. 3 shows a polarizer-analyzer system using grids according to the present invention.

FIG. 3 shows a typical system in which the gratings may be used. A source of IR radiation 31 is mounted on an optical platform 30 and projected through polarizer 32 and an analyzer 33 to a detector 34 all mounted on the same platform. By rotating the polarizer and/or the analyzer, the amplitude and polarization supplied to the detector can be completely controlled. A drawback of this arrangement is that the IR must pass through two backing layers of the film, and a significant amount of IR may thus be absorbed. A better arrangement is shown in 3A. In this arrangement the radiation from source 31 is reflected from the silver image surfaces of the polarizer 32 and analyzer 33 to detector 34. The surfaces referred to are both adjacent to the image protection layers (see layer 14 in FIG. 1). This layer and the image receiving layer 15 are very thin and absorb very little energy. Another benefit results for IR sources that have wavelengths close to the spacing of the grating lines. At these frequencies, a significant portion of the desired polarization reflected by the analyzer and polarizer is also passed by these elements, while very little of the undesired cross polarized energy is reflected. Thus, while there is an unfortunate loss of desired energy, only the desired polarization is transmitted to the detector 34.

Figure 4A:
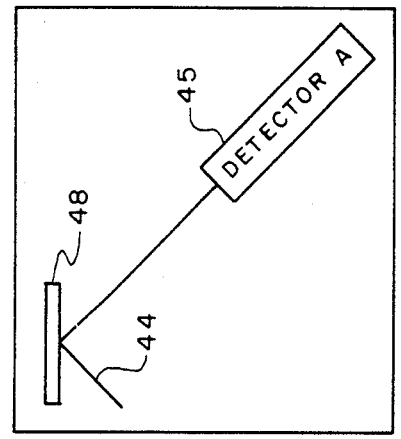
FIG. 4A shows a further modification of the system in FIG. 4.
Figure 4:
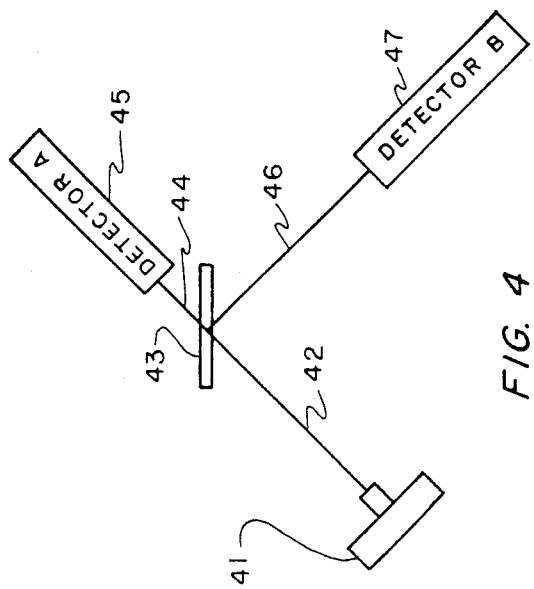
FIG. 4 shows a beam-splitting system using a polarization grid according to the present invention.

FIG. 4 shows another system wherein the grating is used as a beam splitter. IR energy 42 radiating from source 41 is split by grating 43 into a direct beam 44 to detector 45 and a reflected beam 46 to detector 47. Beam 42 again reflects from the image protection layer previously described. Beam 44 to detector 45 thus may contain some of the polarization going to detector B, if the wavelength approaches the spacing of the grating lines. Beam 44 may also suffer more attenuation than beam 46. Neither of these conditions may occur or affect detector A, in any case, if they do occur, detector B will receive only the desired polarization. The source 41 (and source 31 in FIG. 3) may supply different information on the two polarizations separated by the grating or gratings. If a high level of undesired polarization is transmitted to detector 45 this can be removed by reflecting beam 44 off the surface of an additional grating 48 as shown in FIG. 4A.

I claim:

1. In a far-infrared system having a polarized wire grid filter, the improvement wherein said filter comprises:
   only a sheet of silver diffusion transfer film, exposed to a light image of said grid and developed, so that said grid is formed as a specularly reflecting silver image covered only by a transparent protective layer with a thickness measuring only a small fraction of a wavelength in the far-infrared spectrum.
2. A system according to claim 1 wherein:
   said grid consists of a series of straight, parallel silver strips.
3. A system according to claim 1 wherein:
   said grid consists of a series of curved, parallel silver strips.
4. A system according to claim 1 wherein:
   said grid consists of a series of circular, parallel silver strips.
5. The method for making a far-infrared wire grid filter, comprising the steps of:
   focussing a light image of said grid on the emulsion layer of a first sheet of unexposed silver diffusion transfer film; and
   instantly developing said film, such that the emulsion and antihalation layers are removed and said filter consists only of a thin specularly reflecting silver image of said grid in a thin receiving layer on a film support layer, said receiving layer being covered only by a protective layer less than a wavelength thick at far-infrared frequencies.
6. The method according to claim 5 wherein said first sheet is color film containing a filter screen of repeating parallel color stripes and the step of focussing a light image further includes the steps of:
   exposing said first sheet to colored light sources corresponding to one and not more than two adjacent stripes, and
   instantly developing said color film.
7. Claim 6 further including the step of:
   contact printing the resultant color image on a second sheet of black and white silver diffusion transfer type film; and
   instantly developing said black and white film.
8. The method according to claim 5 wherein said light image prior to focussing is orders of magnitude greater than said silver image and said step of focussing involves:
   focussing said light image by means of the lens system of a camera.
9. The method according to claim 5 wherein said step of focussing comprises:
   placing said first sheet of developed silver diffusion transfer film, so that its image protecting layer is directly in contact with the corresponding layer of said second unexposed sheet, said first sheet being between said unexposed sheet and at least one source of light passed by said first sheet.
10. The method according to claim 9 wherein:
    said source of light is a point source.

* * * * *